United States Patent

Boulanger et al.

[11] Patent Number: 5,963,584
[45] Date of Patent: Oct. 5, 1999

[54] DIRECT SEQUENCE SPREAD SPECTRUM TRANSMISSION PROCESS, WITH GENERATION AND OPTIMIZATION OF SEQUENCES

[75] Inventors: Christophe Boulanger, Eybens; Jean-René Lequepeys, Fontaine; Laurent Herault, Claix, all of France

[73] Assignee: Commissariat a l'Energie Atomique, Paris, France

[21] Appl. No.: 08/966,250

[22] Filed: Nov. 7, 1997

[30] Foreign Application Priority Data

Nov. 29, 1996 [FR] France .................................. 96 14671

[51] Int. Cl.$^6$ .................................................. H04B 1/707
[52] U.S. Cl. ................................................................ 375/206
[58] Field of Search ..................... 375/200, 206, 375/208, 329, 330, 283

[56] References Cited

U.S. PATENT DOCUMENTS 4,862,478   8/1989   McIntosh .................................. 375/200
5,206,882   4/1993   Schloemer ................................. 375/200

OTHER PUBLICATIONS

Kavehrad et al. "An Experiment With Direct Sequence Spread Spectrum Using DPSK Modulation" IEEE pp 3.5.1–3.5–5, 1987.

Primary Examiner—Temesghen Ghebretinsae
Attorney, Agent, or Firm—Oblon, Spivak, McClelland, Maier & Neustadt, P.C.

[57] ABSTRACT

Direct sequence spread spectrum transmission process that generates and optimizes sequences used by respective users of a communications system. A set of random sequences is produced and the sequences are optimized by a combinatorial operation in order to minimize residual noise. The random sequences belong to an $M^{th}$ set of roots unity, where respective of the N random sequences have given length L.

9 Claims, 3 Drawing Sheets

1

DIRECT SEQUENCE SPREAD SPECTRUM TRANSMISSION PROCESS, WITH GENERATION AND OPTIMIZATION OF SEQUENCES

TECHNICAL FIELD

The purpose of this invention is a direct sequence spread spectrum transmission process, with generation and optimization of sequences. Its applications include transmissions, and particularly:

in the military domain: infantryman's walkie talkie, remote measurements, etc., in wireless LANs, in the consumer domain: radiotelephones, indoors cordless telephone, domotics (alarm systems, etc.), in industrial LANs, in the transport field, in multi-point to point links, in which the use of radio-electric transmissions provides more flexibility than a traditional method using optical fibers and requiring adjustment as far as the final subscriber.

STATE OF THE PRIOR ART

The direct sequence spread spectrum modulation technique has been used for many years. It is worth briefly summarizing the principle.

In a digital data transmitter using a conventional technique, data to be transmitted modulate a radio carrier. The modulation used may be a phase, frequency or amplitude modulation, or may be a mixed modulation. This discussion will only consider phase modulations, which are the most frequently used at the present time, in order to simplify the presentation.

Digital data to be transmitted are binary elements, or bits. These bits have a period $T_b$. With these bits, it is possible to build up groups called symbols, for which the period, denoted $T_s$, is a multiple of $T_b$. These symbols will modulate the radioelectric carrier, for example in phase.

This technique can be illustrated by two examples of phase modulation:

a) the BPSK ("Binary Phase Shift Keying") type of modulation; this consists of assigning a phase state, for example 0, to the 0 bits and a π phase state to the 1 bits; in this case, the symbol is the bit itself and $T_s=T_b$; the phase state of the radio carrier is imposed once every bit;

b) the QPSK ("Quaternary Phase Shift Keying") type of modulation; this consists of using symbols formed of two successive bits; therefore, these symbols may take on four states (00, 01, 10, 11); a carrier phase state is assigned to each of these states; in this case, $T_s=2T_b$ and the phase state of the radio carrier is imposed once every two bits.

The received signal has to be demodulated at the reception end. One method consists of using an incoherent demodulation technique which is based on the observation by which all that is necessary is to compare the phase reference of the current symbol with the phase of the previous symbol. In this case, the receiver only estimates the phase difference between two successive symbols. This then involves a DPSK ("Differential Phase Shift Keying") or DQPSK ("Differential Quadrature Phase Shift Keying") type of differential phase modulation.

In the direct sequence spread spectrum technique, the sequence of symbols (obtained after differential coding in the case of differential phase modulation) is multiplied by a pseudo-random sequence with a binary throughput L times higher than the throughput of data to be transmitted. Each binary element in the pseudo-random sequence is called a "chip". Therefore its duration $T_c$ is equal to $T_s/L$.

FIGS. 1 to 3 attached schematically show the structure and operation of a spread spectrum transmitter and receiver operating in DPSK. This state of the art corresponds to document FR-A-2 712 129.

Firstly, FIG. 1 shows the block diagram of a transmitter. This transmitter has one input Ee which receives data $b_k$ to be transmitted and is fitted with a differential encoder 10 composed of a logic circuit 12 and a delay circuit 14; furthermore, the transmitter includes a pseudo-random sequence generator 30, a multiplexer 32, a local oscillator 16 and a modulator 18 connected to an output Se which outputs the DPSK signal.

The logic circuit 12 receives binary data $b_k$ and outputs binary data $d_k$. The logic circuit 12 also receives data delayed by one rank namely $d_{k-1}$. The logic operation done in circuit 12 is an exclusive-OR operation on the $b_k$ data and on the delayed complement of $d_k$.

The pseudo-random sequence used in transmission to modulate the data must have even and odd self-correlation functions with a marked peak for zero delay and the smallest possible secondary lobes. This may be obtained by using maximum length sequences (also called m-sequences) or, for example "GOLD" or "KASAMI" sequences.

FIG. 2 attached shows the block diagram for a corresponding receiver, of the differential demodulator type. This receiver has an input Er and comprises an adapted filter 20, in which the pulse response is the same as the pseudo-random sequence used in the transmitter but in the reverse order, a delay circuit with a duration $T_b$ reference 22, a multiplier 24, an integrator 26 on a period $T_b$ and a decision logic circuit 28. The receiver has an output Sr that restores the data.

If the signal applied to the input Er is denoted x(t), the multiplier 24 receives the filtered signal $x_f(t)$ and the filtered-delayed signal $X_f(t-Y_b)$. The product is integrated over a period equal to or less than $T_b$, in integrator 26, which outputs a signal the polarity of which can be used to determine the value of the transmitted bit.

The input filter 20 used in the receiver has an equivalent pulse response in the base band, denoted H(t), and this response must be the conjugated complex of the pseudo-random sequence used at the time of transmission, in the reverse order.

Therefore, the adapted filter 20 makes the correlation between the signal applied at its input and the pseudo-random spread sequence.

Therefore, in a channel with additive gaussian noise, the signal $X_F(t)$ will be presented in the form of a pulse signal, the pulse repetition frequency being equal to $1/T_b$. The envelope of this signal is the signal self-correlation function c(t). The information is transferred by the phase difference between two successive correlation peaks.

Therefore, the output from the multiplier will be formed of a succession of positive or negative peaks depending on the value of the transmitted bit.

In the case of a radio transmission in the presence of multiple paths, the output of the adapted filter will be formed of a succession of correlation peaks, each peak corresponding to a propagation path.

The various signals in the reception system are shown in FIG. 3. Line (a) represents the filtered signal $x_F(f)$; line (b)

represents the correlation signal $X_F(t)^* x_F(t-T_b)$ line (c) represents the signal at the integrator output.

The direct sequence spread spectrum modulation technique has been extensively described in the specialized literature, for example in the following books:

"CDMA Principles of Spread Spectrum Communication", by Andrew J. VITERBI, Addison-Wesley Wireless Communications Series;

"Spread Spectrum Communications" by Marvin K. SIMON et al., vol. I, 1983, Computer Science Press;

"Spread Spectrum Systems", by R. C. DIXON, John WILEY and Sons.

There are many advantages of using the direct sequence spread spectrum modulation technique:

1. Discretion: this discretion is related to the spread in the information transmitted over a wide frequency band; this results in a low spectral density of transmitted power.

2. Multiple access: several links using direct sequence spread spectrum may share the same frequency band using pseudo-random orthogonal spreading sequences (sequences with the best possible inter-correlation and self-correlation functions); more particularly, a different pseudo-random sequence of the same length is associated with each link or user; this technique, which is called coded distribution multiple access (CDMA) is difficult to implement since sequences used in the past have not been sufficiently "orthogonal" with each other, and this method imposes a suitable power control. This point is at the heart of the technical problem solved by the invention, as will be described later.

3. Good cohabitation with conventional narrow band communications; the same frequency band can be shared by systems using narrow band modulation and systems using wide band modulation; narrow band communications only experience a slight increase in the ambient radioelectric noise; communications with spread spectrum modulation reject narrow band modulations by means of the correlation operation carried out at reception.

4. The interception difficulty: a direct sequence spread spectrum transmission is difficult to intercept due to the low spectral density and the fact that the receiver must know the spreading sequence before it can demodulate the data.

5. Excellent behavior in a multi-path environment: in this type of environment, propagation of the radioelectric wave takes place along multiple paths which involve reflection, diffraction and diffusion phenomena; furthermore, it is possible that there is no long term stable path between the transmitter and the receiver; this propagation by multiple paths induces parasite effects which tend to degrade the transmission quality.

The spread spectrum technique, although very beneficial, does have some difficulties:

1. Widening of the pulse response: this effect is related to the fact that the various paths reaching the receiver have different group delays; this increase in the pulse response imposes a limiting value on the throughput of information to be transmitted; the duration of the transmitted symbol must be much higher than this pulse response width, if an acceptable error rate is to be obtained.

2. Fading: the origin of fading is the reduction in the vectorial sum made at the reception antenna; this reduction corresponds to destructive interference between the various received signals; large level fluctuations also occur in the case of a fixed point to fixed point link. In this case, they are generated by personnel or vehicle movements within the radioelectric environment. Techniques conventionally used to overcome this problem are "diversity" techniques, consisting of using several statistically independent signals to obtain the useful information (for example several reception antennas).

3. Doppler noise; the Doppler effect causes an offset in the signal frequency on reception; this offset is proportional to the displacement speed and the cosine of the angle formed by the speed vector and the electric field associated with the radioelectric wave; in an environment with multiple paths, the offset results in frequency noise since the directions from which the various paths arrive are arbitrary.

One of the essential characteristics of the spread spectrum technique is the use of bit sequences. These sequences are formed of bits which are the $M^{th}$ roots of the unit, namely $$\exp\left( j \frac{2k\pi}{M} \right)$$

for k=0, 1, 2, etc. (M−1), where j is the symbol for imaginary numbers ($j^2$=−1).

In the case of the BPSK modulation, the number M is equal to 2 and the two values of the bits are obtained for k=0 and k=1, namely 1 and −1. The phase of the carrier is then equal to 0 or $\pi$. For QPSK modulation, M is equal to 4 and the four possible values for the bits are 1, j, −1 and −j. The phase of the carrier is then equal to 0, $\pi/2$, $3\pi/2$ or $\pi$. In the following, the value of these bits will be denoted as "cas". I.e., "cas" will be equal to +1 or −1 for BPSK modulation, and 1, j, −1, −j for QPSK modulation.

A more complete description of these sequences is given in:

"Crosscorrelation Properties of Pseudo-random and Related Sequences" by D. V. SARWATE and M. B. PURSLEY, published in IEEE Proceedings, vol. 68, pp. 593–619, May 1980;

"Korrelationsignale" by H. D. LUKE (Springer-Verlag Berlin Heidelberg, New York, 1992).

However, mathematical theory on which the construction of these sequences is based, is usually only capable of optimizing even or periodic correlations of families of sequences. In the case of synchronization, bit sequences in the family must have favorable even self-correlation functions, i.e. the following functions of u:

$$\underset{u}{\text{Max}} \left| \sum_{i=0}^{L-1-u} X_i X_i^* + u + \sum_{i=L-u}^{L-1} X_i X_i^* + u \right|$$

must be as small as possible for integer values of $\mu$ not equal to 0 modulo the sequence length L, for all orthogonal sequences in order to enable multiple access. The literature only provides means of finding sequences with good qualities for even inter-correlation functions, i.e. the following functions of u:

$$\underset{u}{\text{Max}} \left| \sum_{i=0}^{L-1-u} X_i X_i^* + u + \sum_{i=L-u}^{L-1} X_i X_i^* + u \right|$$

must be as small as possible regardless of the integer value of u, regardless of the various sequences ($X_r$) and ($Y_r$) with the same length L of the family of pseudo-random sequences considered. In these expressions, $X_i$ and $Y_i$ are the values of bits in the sequence considered. Remember that these bits making up the sequences are equal to 1 or −1 for binary sequences and 1, j, −1 or −j for quaternary sequences.

Unfortunately, it is not sufficient to simply minimize these functions for all different possible sequences with the same length L. When consecutive bits are different, the functions to be minimized are as follows:

$$\text{Max}_u \left| \sum_{i=0}^{L-1-u} X_i Y_i^* + u + cas \sum_{i=L-u}^{L-1} X_i Y_i^* + u \right|,$$

for the different $(X_r, Y_r)$ sequences in the family, for all integer values of u, and $$\text{Max}_u \left| \sum_{i=0}^{L-1-u} X_i X_i^* + u + cas \sum_{i=L-u}^{L-1} X_i X_i^* + u \right|,$$

for all sequences $(X_r)$ in the family and for all integer values of u other than 0 modulo the sequence length L. In these expressions, the "cas" term is equal to 1 or −1 for the case of a differential phase modulation in which data transmitted represented by their various phase differences take on only two states (0 or π) (DBPSK) and 1, j, −1, or −j when the phases are 0, π/2, 3π/2 or π (DQPSK).

The maximum of these functions for all sequences making up the family will be called the "residual noise" below. This value is the value that has to be minimized in the case of a coded distribution multiple access (CDMA). It gives better synchronization of data transmitted by the different users to the adapted filters.

To summarize, techniques used in prior art have an initial disadvantage related to the fact that the sequences used are built to simply optimize even self-correlation and inter-correlation functions.

Another disadvantage may be emphasized. Sequences built according to prior art do not exist for all sequence lengths. We only know how to build up sequences with a length equal to integers of the type $2^n-1$ (where n is an integer). The number of different sequences obtained is relatively low (for example $2^{n/2}$ for the KASAMI family and n+2 for the GOLD family).

The major disadvantages related to this type of family of sequences are as follows:

If less sequences of a given length are required, the best sequences will be extracted from the set of optimum sequences, but nothing guarantees that they will be optimum, i.e. there is no guarantee that the set of sequences obtained will have the best performances. In reality, experience shows that performances obtained with this type of set are far from being satisfactory.

Furthermore, these techniques do not provide a solution if the number of sequences required exceeds the number available in the set.

Finally, there is nothing in the literature to provide assistance if sets of sequences are required for different lengths.

This invention is designed to overcome all these disadvantages.

DESCRIPTION OF THE INVENTION

Consequently, the invention recommends generating a set of sequences, the number and length of which take account of constraints imposed by the transmission system (number of users, propagation conditions, information throughput, etc.), these sequences furthermore being optimized in the sense that they minimize the previously defined quantities, defining what has been called "residual noise", the optimization taking account of all self-correlation and inter-correlation functions (and not only even functions). According to the invention, this optimization is obtained by a process consisting of starting from random sequences and developing a process of the type used in combinatorial analysis, to reach a set of sequences minimizing residual noise. These sequences are then assigned to the various users of the transmission system. If constraints change, for example by reducing the number of users, a new set of sequences can be redefined, still optimized by a combinatorial analysis and this new set can be reassigned to the remaining users. Therefore, the process according to the invention gives an assurance that the set of sequences will always be optimum regardless of constraints imposed on the system.

More precisely, the purpose of this invention is a direct sequence spread spectrum transmission process, in which:

A) In transmission pseudo-random sequences of elements are produced, belonging to the $M^{th}$ set of roots of the unit with a higher throughput than the throughput of data to be transmitted, one of these sequences is assigned to each user of the process, data to be transmitted to a specific user are multiplied by the sequence corresponding to this user, a radioelectric carrier is modulated by all signals obtained after multiplication of the various data to be transmitted by the corresponding sequences, the signal formed by the carrier modulated in this way, is sent.

B) In reception, at each user:

the transmitted signal is received, the received signal is filtered according to the pseudo-random sequence assigned to this user, the received signal comprising large amplitude peaks called principal peaks, and smaller amplitude peaks called secondary peaks, bit detection is done starting from the principal peaks on the filtered signal, and the transmitted information is restored, this process being characterized by the fact that:

a set of N random sequences of elements is produced, belonging to the $M^{th}$ set of roots of the unit, these sequences all having a given length L, these sequences are optimized with respect to their self-correlation and inter-correlation functions using a combinatorial optimization process, this optimization consisting of minimizing the following two quantities at the same time:

$$\text{Max}_u \left| \sum_{i=0}^{L-1-u} X_i Y_i^* + u + cas \sum_{i=L-u}^{L-1} X_i Y_i^* + u \right|,$$

where u is an integer and for all pairs of (X, Y) sequences in the set, X and Y being two different sequences, and $$\text{Max}_{u \neq 0} \left| \sum_{i=0}^{L-1-u} X_i X_i^* + u + cas \sum_{i=L-u}^{L-1} X_i X_i^* + u \right|$$

where u is an integer not congruous to 0 modulo L for all X sequences in the set, the "cas" factor being equal to the various possible values of elements belonging to the $M^{th}$ set of roots of the unit, one of these sequences thus optimized is assigned to each user, if conditions for using the process change, another set of optimized sequences is produced and the new optimized sequences obtained are reassigned to the different users.

Any known combinatorial optimization technique may be used in the invention. Beneficially, one of the following techniques may be used:

a) techniques derived from statistical physics called "simulated annealing" or microcanonic annealing and their variants. A description of these methods is given in the following publications:

"Optimization by Simulated Annealing" by S. KIRKPATRICK, C. GELATT and M. VECCHI, in "Science", vol. 220, 1983;

"General Local Search Heuristics in Combinatorial Optimization: a Tutorial", by M. PIRLOT in "Belgian Journal of Operations Research, Statistics and Computer Science", vol. 32, No. 1–2, 1992;

"Figure-Ground Discrimination: a Combinatorial Optimization Approach", by L. HERAULT and R. HORAUD, in "IEEE Transactions on Pattern Analysis and Machine Intelligence", vol. 15, No. 9, September 1993.

b) Models derived from genetic processes: genetic algorithms and their variants. A description of these methods is given in the following publications:

"Genetics Algorithms in Search Optimization and Machine Learning", by D. GOLDBERG, ADDISON-WESLEY, Reading, Mass., 1989;

"General Local Search Heuristics in Combinatorial Optimization: a Tutorial" by M. PIRLOT in "Belgian Journal of Operations Research, Statistics and Computer Science", vol. 32, No.1–2, 1992.

c) Memory processes: the "TABU" search and its variants. The following publications give a description of these methods:

"TABU Search" by F. GLOVER and M. LAGUNA, in "Modern Heuristic Techniques for Combinatorial Problems", 1992;

"General Local Search Heuristics in Combinatorial Optimization: a Tutorial", by M. PIRLOT, in "Belgian Journal of Operations Research, Statistics and Computer Science", vol. 32, No. 1–2, 1992.

In one beneficial embodiment applicable to the special case of a binary phase modulation (M=2), and when the data to be transmitted are binary, a coding process is applied after the transmission step in which data are multiplied by the sequence corresponding to the specific user and before the radioelectric carrier modulation step; for example this coding process may use an error correction code, interlacing, etc., to eliminate errors related to transmission channels.

On reception, after the appropriate filtering step, a decoding process is applied consisting of multiplying the filtered signal and the delayed filtered signal.

For example, the coding process may be as described in document FR-A-2 707 441. The binary information is then restored using a diversity process. For example, the diversity process may consist of integrating energies transported by each transmission channel propagation path.

DETAILED DESCRIPTION OF SPECIFIC EMBODIMENTS

Figure 1:
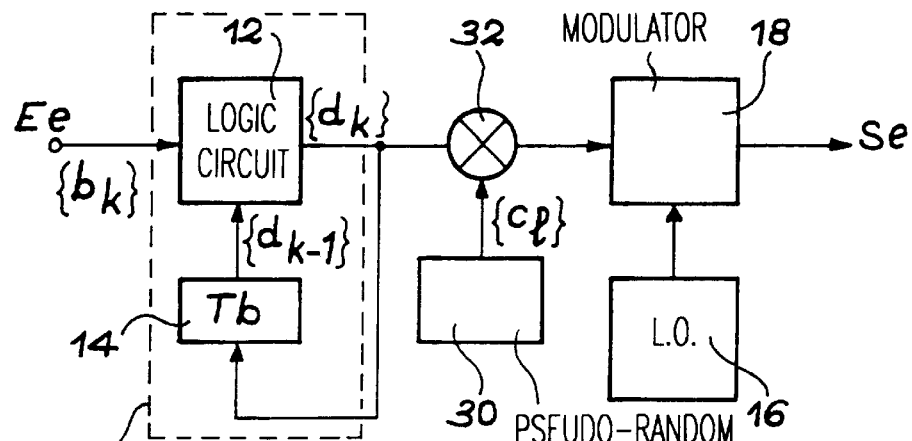
FIG. 1, already described, is a block diagram of a known spread spectrum transmitter.
Figure 2:
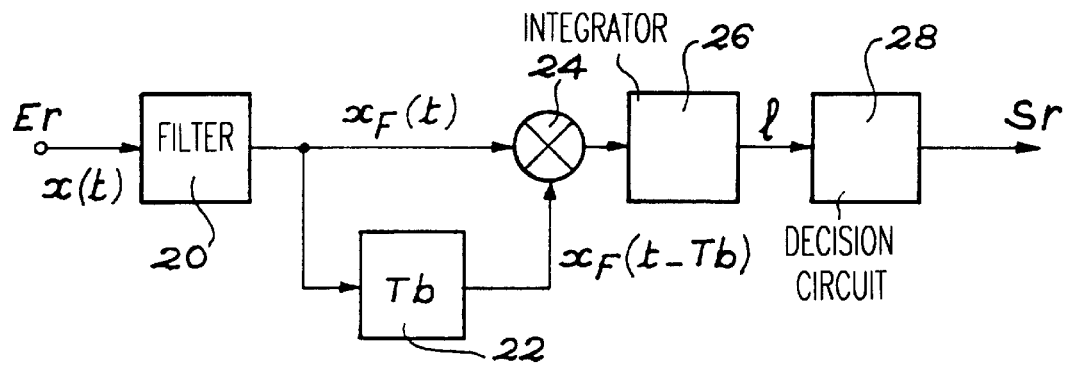
FIG. 2, already described, is a block diagram for a known spread spectrum receiver.
Figure 3:
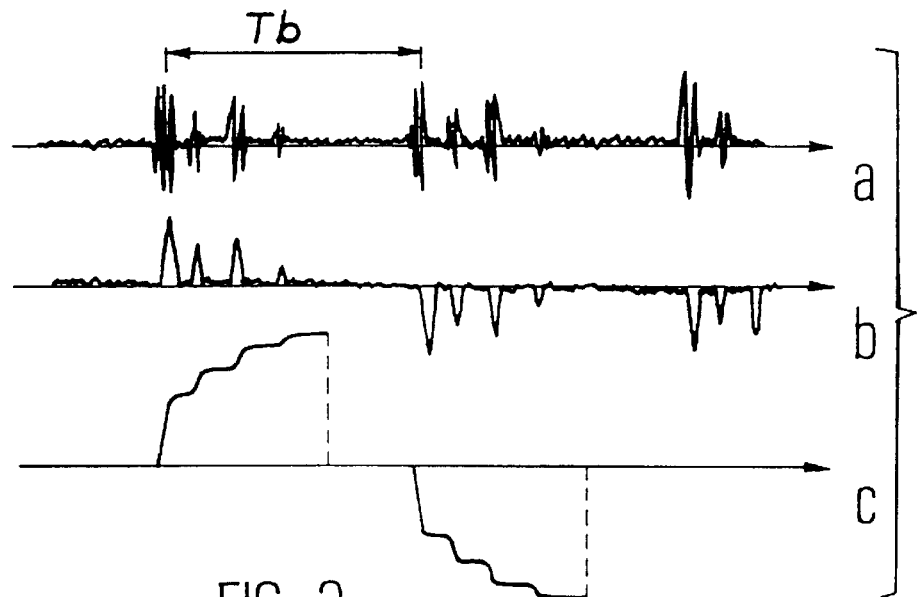
FIG. 3, already described, illustrates the general operation of a receiver.

Some examples of embodiments of the process according to the invention will be described for various combinatorial optimization methods. In these example, the quantities defined above representing the presence of residual noise will be called the "cost function". In all examples that will be given, the formulas and numeric values given must be considered as examples that the inventors consider as being good embodiments, particularly for speed. But it is obvious that the invention is not restricted to these examples.

A) Use of the "Tabu" Method

This optimization process includes 9 steps:

1. Starting from a family of N randomly generated sequences (the quality of the solutions found by combinatorial optimization algorithms is not very dependent on the initial state). A family of "tabu" lists, of the same size, is associated with this family, the elements of which contain the "tabu" values associated with each position of the sequence bits for the family. At the beginning, all "tabu" values are initialized at 0. A first cost function is calculated as described above, starting from this initial configuration.

2. A number S of bits that will be observed in this sequence family is then defined. For example, S may be defined by the formula $$N = E\left(\frac{L}{30}\right) + 1,$$

where E (x) designates the integer part of the real x between parentheses, and an initial value, T, of the tabu parameter is defined as $$T = E'\left(\frac{7L}{80}\right),$$

where E' (.) is such that X is a real number, where L>11 and T=1 else:

$$\begin{cases} \text{if } X - E(X) < 0.5, \text{ then } E(X) = E(X) \\ \text{if } X - E(X) < 0.5, \text{ then } E(X) = E(X) + 0.5 \end{cases}$$

3. The bits that will be scanned at random are then determined. This set may be called the current "neighborhood".

4. For each of these positions or neighborhood elements, an estimate is made of the performance improvement that could be obtained by changing the value of the associated bits, i.e. an evaluation is made of the cost function associated with the elementary transformation of each of these elements separately:

If the change in these bits tends to minimize the cost function, then they will be modified provided that they are not modified too frequently. This is determined using the "tabu" list associated with the positions of the bits in the sequence. Each time these bits are selected, the value of the tabu parameter is reinitialized if it is not zero at the time of this choice.

Otherwise, a bit in the current neighborhood corresponding to another better change is modified in any case (provided that its tabu parameter is zero, and even if the performance of the current solution is degraded). The idea is to move local minima in multi-dimensional space and to "store" the best solution found. If a current "neighborhood" gives the same performance after several bit modifications, a random draw is made to determine the bit for which the value will be modified.

5. After modifying the bit, a new current configuration is obtained.

6. Elements making up the "tabu" list are decremented by one unit, unless they are zero. Return to step 3 until I iterations or bit changes have been made, otherwise go on to step 7. I has been chosen to be equal to 10 000 for the numeric examples which will be described later.

7. The value of S is increased (diversification process), for example S becoming S+z where z is a positive integer, for example z=5, and return to step 3 as long as the value of S is less than the sequence length L, otherwise go on to step 8.

8. The value of the tabu parameter T is reduced, T becoming T–1, then restart at step 3 until T is equal to zero, otherwise go on to step 9.

9. Stop and save the best family of sequences obtained during the search.

Figure 4:
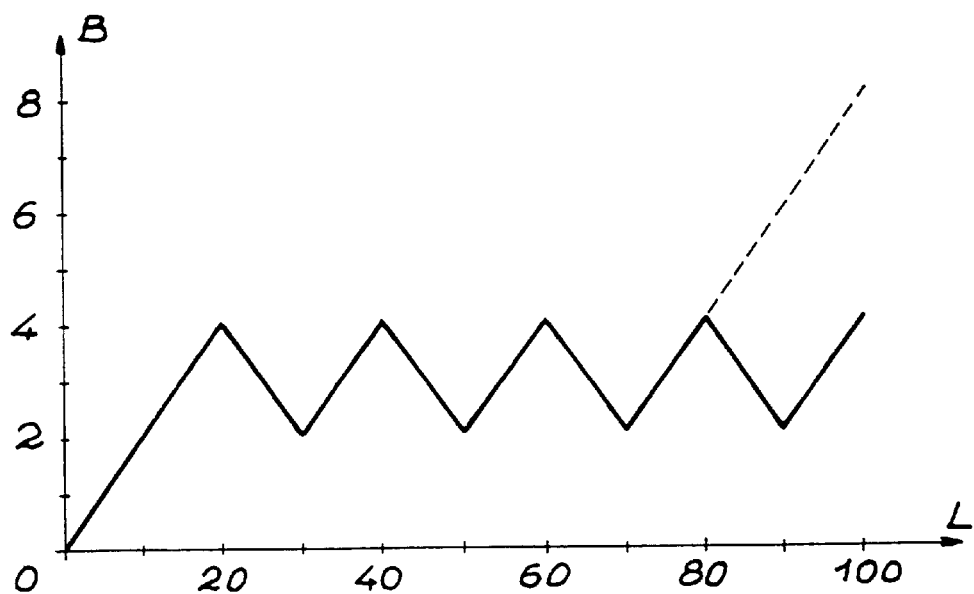
FIG. 4 illustrates the residual noise variations obtained for a unique sequence as a function of its length.

The performances obtained are illustrated in FIG. 4 in the case of a single sequence. The length L of the sequence is shown along the abscissa and the residual noise B is shown along the ordinate. The curve shown in a solid line is the theoretical optimum and the curve shown as a dashed line is obtained using the invention. It can be seen that the results are optimum for sequence lengths of up to 80. For longer sequences, the quality of the results is slightly below the theoretical optimum (the residual noise is greater) but performances remain good (up to lengths of about 150).

Figure 5:
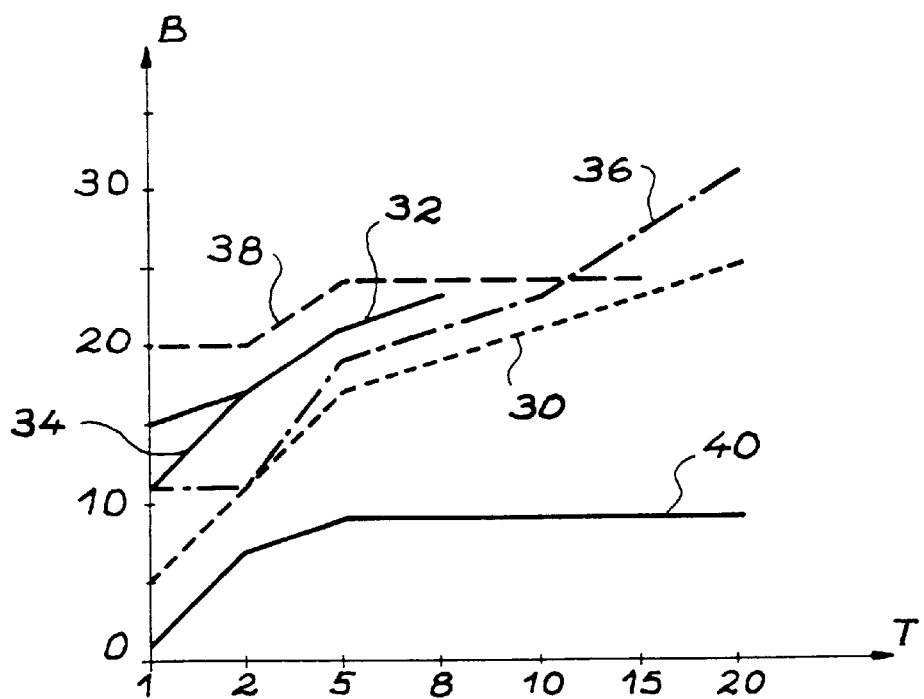
FIG. 5 shows the residual noise variations as a function of the size of the family of sequences, for binary sequences.

For families of sequences, performances are illustrated in FIG. 5 for the case of binary sequences with a sequence length L equal to 63. The size N of the family is shown along the abscissa, and the residual noise B is shown along the ordinate.

Curve 30 is obtained by the invention. Curves 32, 34, 36, 38 and 40 correspond to prior art using the NO, KASAMI, Dual BCH, IM3 and WELCH techniques respectively. The WELCH technique only uses even correlations.

Figure 6:
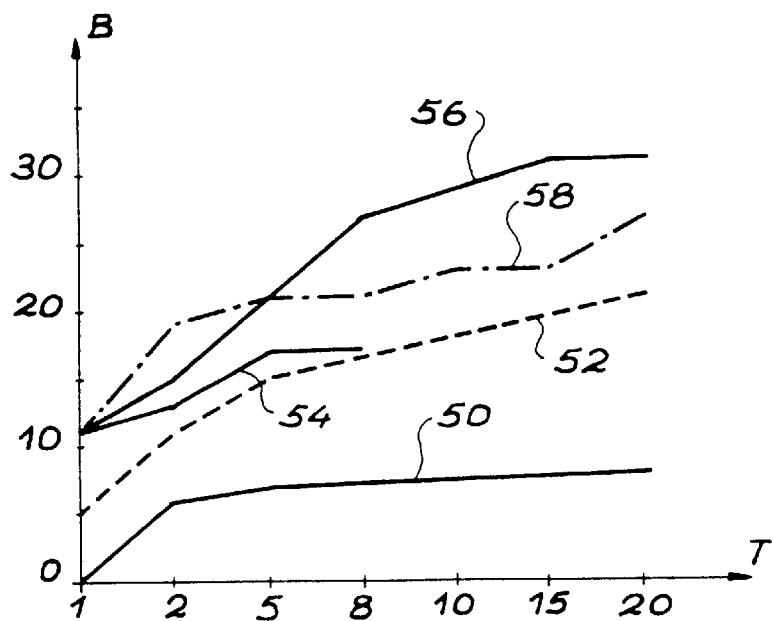
FIG. 6 shows the residual noise variations as a function of the family of sequences, for quaternary sequences.

FIG. 6 shows performances obtained with quadriphase sequences, always of length 63. The invention produces curve 52; curves 54, 56, 58 and 60 are obtained using the NOVOSAD, EOE, COSET and WELCH methods respectively, the WELCH method being restricted to the even correlation.

B) Embodiment Using the "Simulated Annealing" Method

1. For example, we will once again start from a family of randomly generated sequences. This family will be associated for example a number Nb=100 L and a value Te, called the temperature, T=4L. T=4L may also be replaced by an automatic determination process; for example, T may be initialized such that 80% of transformations made will be accepted. Starting from this initial configuration, a first cost function will be calculated as defined above.

2. The bit to be observed in a random manner is then determined.

3. The cost function associated with the elementary transformation of this bit is calculated, this cost function differing from the previously evaluated cost function by a quantity $\Delta E$. A "Metropolis" criterion is then applied:

If the bit change tends to minimize the cost function, i.e. $\Delta E < 0$, then the change will be made.

Otherwise, it will be decided to modify this bit with a BOLTZMANN type probability:

$$p = \exp - \frac{(\Delta E)}{kTe}.$$

The idea is to increase the chances of accepting an "unfavorable" modification when Te is large, rather than when Te is small.

4. After deciding whether or not to modify the bit, a new current configuration is obtained; step 2 is then repeated, for example until 10L transformations have been accepted, or until Nb accepted or unaccepted transformations have been made; in this case, go on to step 5, unless the percentage of accepted transformations compared with the number of tested sequences is below a certain limit, for example 0.01%; in this case, go on to step 6.

5. The temperature is reduced, for example from Te to 0.95Te, and then step 2 is repeated.

6. Set Te=0 and make random changes to see if a better quality family of sequences can be obtained (classical top down technique); if this is the case, the system is said to be frozen, and step 7 is then performed; otherwise the temperature is increased to its value immediately before Te, for example to 1.3Te, and step 2 is repeated.

7. Stop and save the best family of sequences obtained during the search.

C) Embodiment Using the "Microcanonic Annealing" Method

1. This method also starts from a randomly generated family of sequences. It is associated with numbers Nc and EC, for example Nc=100L and EC=L. A first cost function is calculated starting from this initial configuration.

2. The bit to be observed in a random manner is then determined.

3. The cost function associated with the elementary transformation of this bit is then calculated, this cost function differing from the previously evaluated cost function by a quantity $\Delta E$. A "CREUTZ" criterion is then applied:

If the change in this bit tends to minimize the cost function, i.e. if $\Delta E > 0$, then the bit will be changed. The value of EC is also modified to EC–$\Delta E$.

Otherwise, this bit is modified in any case if EC>$\Delta E$, and in this case the value of EC is modified as in the previous paragraph. Otherwise, the transformation is refused, and EC is not modified.

4. After deciding whether or not to modify the bit, a new current configuration is obtained; step 2 is then repeated, for example until 10L transformations have been accepted, or until 100 Nc accepted or unaccepted transformations have been made; in this case, go on to step 5, unless the percentage of accepted transformations compared with the number of tested sequences is below a certain limit, for example 0.01%; in this case, go on to step 6.

5. The value of EC is reduced, for example to 0.96EC, and then step 2 is repeated.

6. Random changes are made to see if a better quality family of sequences can be found (classical top down technique). If so, it is said that the system is frozen, and step 7 is performed. Otherwise, the value of EC is increased to 1.2EC, and then step 2 may be repeated.

7. Stop and save the best family of sequences obtained during the search.

D) Embodiment Using the Canonic Optimization Method

1. This method starts from a family of sequences, which may for example be generated at random. Starting from this initial configuration, a sequence of random favorable transformations is obtained that will give a new configuration in which the cost function satisfies a local minimum: the energy of this cost function is denoted EF; the numbers No=100L and EC=EF are assigned to this new initial configuration; a first cost function is calculated from this initial configuration.

2. A decision is then made about which bit will be observed at random.

3. The cost function associated with the elementary transformation of this bit is calculated, this cost function differs from the previously evaluated cost function by $\Delta E$. A "modified" CREUTZ criterion is then applied:

If the change in this bit tends to minimize the cost function, i.e. if $\Delta E<0$ and if $EC \leq EF$, then the bit will be changed; the value of EC is also modified to $EC-\Delta E$;

If the change in this bit tends to minimize the cost function, i.e. if $\Delta E<0$ and if $EC>EF$, then the bit will be changed; the value of EC is not modified;

Otherwise, this bit is modified in any case if $EC>\Delta E$, and in this case the value of EC is modified as in the previous paragraph. Otherwise, the transformation is refused, and EC is not modified.

4. After deciding whether or not to modify the bit, a new current configuration is obtained; step 2 is then repeated, for example until 10L transformations have been accepted, or until 100 No accepted or unaccepted transformations have been made; in this case, go on to step 5, unless the percentage of accepted transformations compared with the number of tested sequences is below a certain limit, for example 0.01%; in this case, go on to step 6.

5. The value of EC is reduced, for example to 0.96 ×EC, and then step 2 is repeated.

6. Random changes are made to see if a better quality family of sequences can be found (classical top down technique). If so, it is said that the system is frozen, and step 7 is performed. Otherwise, the value of EC is increased to 1.2EC, and then step 2 is repeated.

7. Stop and save the best family of sequences obtained during the search.

E) Embodiment Using the Genetic Algorithm Method

1. This method starts from a family of sequences generated at random. A first cost function is calculated from this initial configuration.

2. A number Ng of bits that will be observed in this family of sequences is then defined by the formula $$Ng = E\left(\frac{L}{30} + 1\right),$$

where E(x) denotes the integer part of the real x between parentheses.

3. It is then determined which bits will be scanned at random. This set is called the "current neighborhood".

4. For each of these positions or neighborhood elements, an evaluation is made of what difference will be made to the performance by changing the value of the associated bits, i.e. the cost function associated with the separate elementary transformation of each of these elements is evaluated:

If the change in these bits tends to minimize the cost function, then they will be modified; the "modified" sequences will then be matched in pairs at random; a crossover will then be made on these pairs, i.e. a random integer $x \leq L$ is associated with each pair, and the pair of sequences considered is truncated starting from the x(th) rank and parts of sequences are exchanged (this limits matching of alleles for biological processes);

Otherwise, the considered sequences are not modified.

5. Bad matches, i.e. matches that degrade the previous solution, are eliminated; others, i.e. which have performances such that the cost function is at least equal to the cost function of the previous configuration, are kept.

6. After bad matches have been eliminated, a new current configuration is obtained. Step 3 is then repeated for example until 100L accepted or unaccepted transformations have been made; step 7 is performed on the 100L(th) transformation.

7. The value of Ng is increased (for example diversification process); Ng becomes Ng+5, then step 3 is repeated while the value of N is less than the length L of the sequences, otherwise go on to step 8.

8. Stop and save the best family of sequences obtained during the search.

Figure 7:
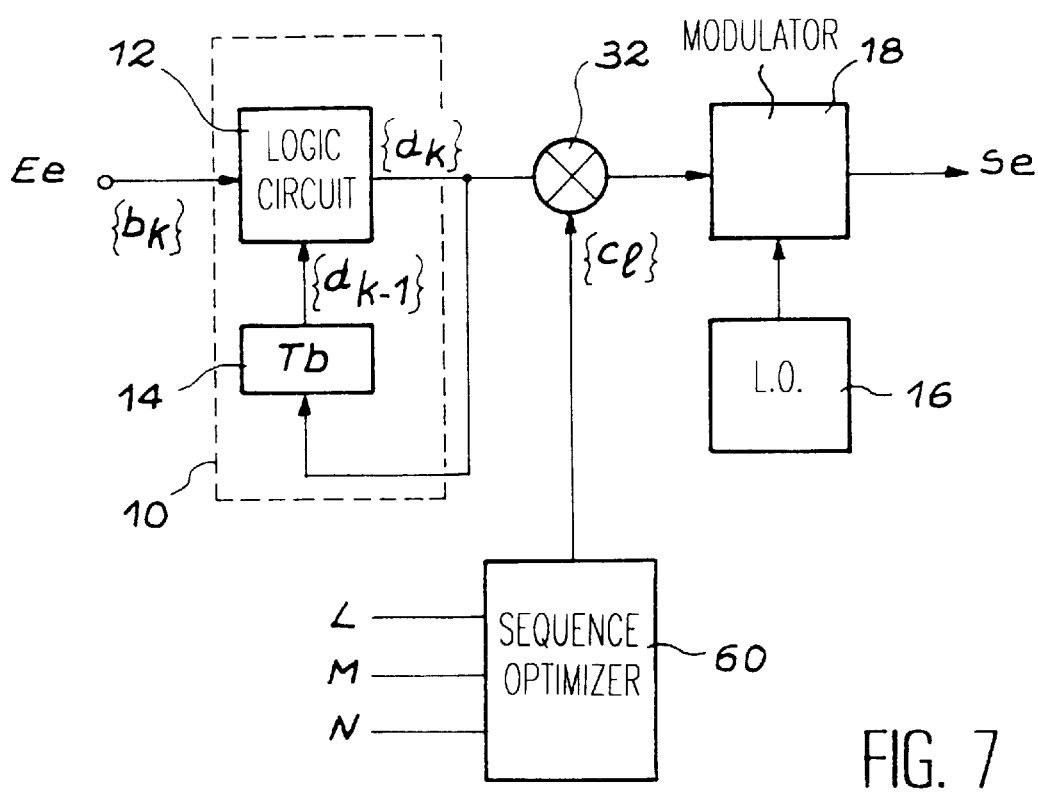
FIG. 7 shows a block diagram for a transmitter making use of the invention.

FIG. 7 schematically illustrates the structure of a transmitter embodying the process according to the invention. In this figure, elements already shown in FIG. 1 have the same references. Circuit 60, which is specific to the invention, receives information about momentary system constraints and, for example, the number of sequences N that are necessary, their length L, the number M representing the modulation type (M=2 for modulation with two phase states called linear modulation and 4 for modulation with four states), etc.

This circuit 60 produces and optimizes a set of sequences as described above and assigns these sequences to the various users. If transmission conditions change, circuit 60 redefines a new set of optimized sequences.

We claim:

1. A method for communicating information via direct sequence spread spectrum transmission, comprising steps of:

transmitting a transmitted signal, including substeps of
producing pseudo-random sequences of elements belong to an $M^{th}$ set of roots of unity with a higher throughput than that for data to be transmitted, said pseudo-random sequences of elements being a set of N random sequences of elements each having a given length L,
optimizing respective of the N random sequences of elements according to respective self-correlation and inter-correlation function of the elements by minimizing both of the following two quantities, $$\operatorname*{Max}_{u}\left|\sum_{i=0}^{L-1-u} X_i Y_i^* + u + cas \sum_{i=L-u}^{L-1} X_i Y_i^* + u\right|,$$

where u is an integer for all pairs of (X,Y) sequences in the set of N random sequences of elements, X and Y being two different sequences, and $$\underset{u \neq 0}{\text{Max}} \left| \sum_{i=0}^{L-1-u} X_i X_i^* + u + cas \sum_{i=L-u}^{L-1} X_i X_i^* + u \right|,$$

where u is an integer not congruous to 0 modulo L for all X sequences in the set of N random sequences of elements, cas being equal to respective possible values of elements belonging to the $M^{th}$ set of roots of unity, assigning respective of the set of N random sequences after said optimizing step to each user and producing another set of optimized sequences for use by each user if conditions for using the method change, multiplying data provided by each user by the sequence assigned to that user, modulating a radio wave carrier with the set of N random sequences assigned in said assigning step after being multiplied with the data in said multiplying step, and transmitting the radio wave carrier after said modulating step as said transmitted signal; and receiving the transmitted signal, including substeps of
receiving the transmitted signal, where the transmitted signal includes large amplitude peaks, referred to as principle peaks and smaller amplitude peaks, referred to as secondary peaks, filtering the transmitted signal by sequence according to the set of N random sequences assigned to each user, detecting values of the data starting from the principles peaks after said filtering step, and restoring the data included in the transmitted signal based on the values detected in the detecting step.

2. The method according to claim 1, wherein:
said producing step includes producing the sequence of elements as binary elements being equal to +1 or −1.

3. The method according to claim 1, wherein:
said producing step includes producing the sequences of elements, with elements being equal to 1, j, −j or −1, when M equals four.

4. The method according to claim 1, wherein:
said optimizing step includes performing a TABU process.

5. The method according to claim 1, wherein:
said optimizing step includes performing a simulated annealing process.

6. The method according to claim 1, wherein:
said optimizing step includes performing a microcanonic annealing process.

7. The method according to claim 1, wherein:
said optimizing step includes performing a canonic optimization process.

8. The method according to claim 1, wherein:
said optimizing step includes performing a generic combinatorial optimization process.

9. The method according to claim 1, wherein:
said modulating step includes modulating the radio wave carrier with binary phase modulation and coding the data after said multiplying step and before said modulating step so as to eliminate errors relating to transmission channels; and said method further comprising a step of, decoding the transmission signal after said filter step.

* * * * *